E. M. PEARSON.
INNER TUBE TO BE USED ON AUTOMOBILES AND OTHER CONVEYANCES.
APPLICATION FILED SEPT. 11, 1916.
1,223,827.
Patented Apr. 24, 1917.
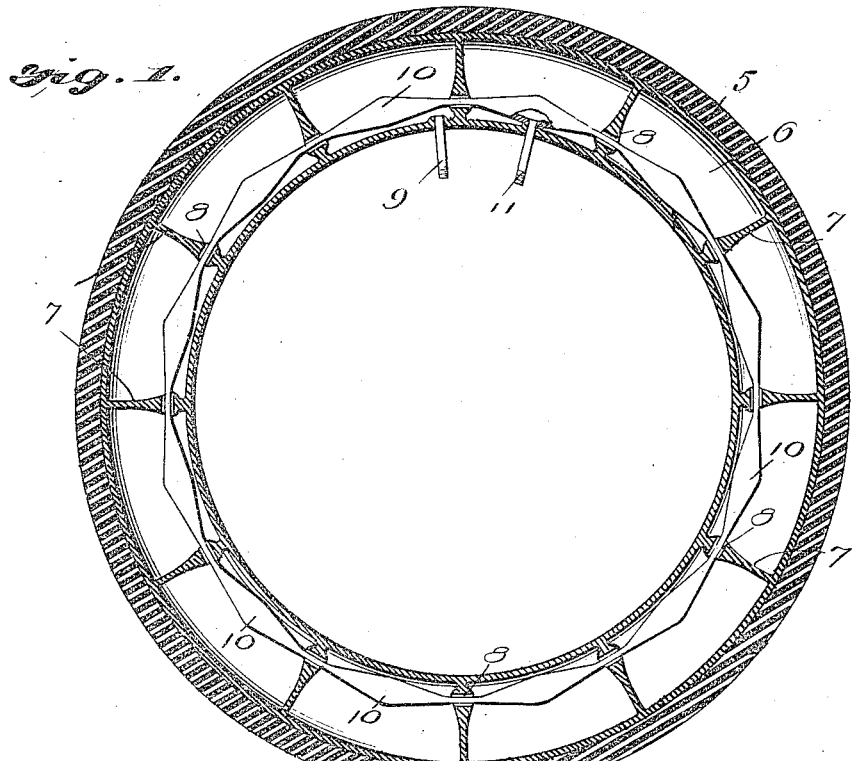
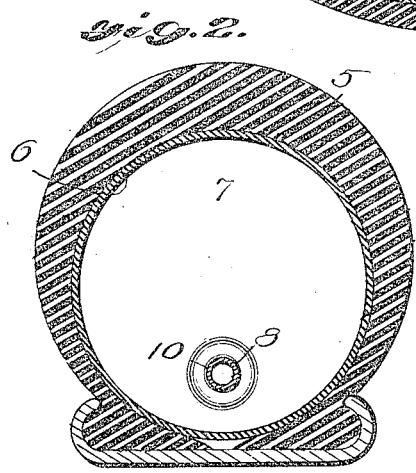
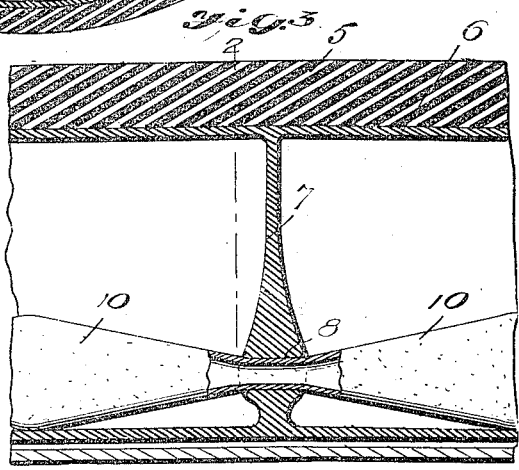
Inventor
EFFIE M. PEARSON

UNITED STATES PATENT OFFICE.

EFFIE MAY PEARSON, OF CHICAGO, ILLINOIS.

INNER TUBE TO BE USED ON AUTOMOBILES AND OTHER CONVEYANCES.

1,223,827. Specification of Letters Patent. Patented Apr. 24, 1917.

Application filed September 11, 1916. Serial No. 119,504.

*To all whom it may concern:*

Be it known that I, EFFIE M. PEARSON, a citizen of the United States, residing at Chicago, in the county of Cook and State of Illinois, have invented new and useful Improvements in Inner Tubes to be Used on Automobiles and other Conveyances, of which the following is a specification.

This invention relates to pneumatic tires consisting of an outer casing and an inner tube, and its object is to provide a novel and improved inner tube structure whereby the tire is prevented from collapsing in the event of a puncture.

The object stated is obtained by forming the inner air-holding tube of the tire into a series of independent compartments so that in the event of a puncture only one of the compartments will become deflated, thereby leaving the tire sufficiently inflated to permit its further use until repairs can be conveniently made. A single inflating valve is employed for pumping air into the inner tube to fill the various compartments, the dividing walls of the compartments having apertures through which the air from one compartment flows into the next, and so on throughout the entire series of compartments. A novel means is also provided for sealing the apertures after the inner tube has been inflated.

In order that the invention may be better understood, reference is had to the accompanying drawing forming a part of this specification, in which—

Figure 1 is a vertical section of the tire;

Fig. 2 is a cross-section thereof on the line 2—2, and

Fig. 3 is an enlarged vertical section of a fragment of the tire.

Referring specifically to the drawing; 5 denotes the usual outer casing of a tire, and 6 is the inner air-holding tube of the tire. The inner tube 6 is continuous, but it is formed with a series of separate compartments, these compartments being produced by transverse partitions 7 extending across the tube. These partitions divide the tube into separate small compartments, and in order that air may be introduced into all of the compartments simultaneously, each partition is provided with a transverse aperture 8 establishing communication between adjacent compartments. An inflating valve 9 is connected to the inner tube to discharge into one of the compartments, and the air introduced into this compartment passes through the apertures in the partitions into the adjacent compartments, and so on throughout the entire series of compartments. After the inner tube is thus inflated it is necessary to seal or close up the apertures 8 as otherwise the entire inner tube would be deflated in the event of a puncture. To effect the closure of the apertures, there is provided an expansible member seating therein. This member is an inflatable continuous tube 10 threaded through the apertures. The diameter of this auxiliary air tube, when it is deflated, is less than the diameter of the apertures 8, and hence the air is free to pass through the apertures from one compartment of the tube 6 into the next. However, when the auxiliary tube is inflated it expands and completely fills the apertures so that the air is now prevented from passing from one compartment into the next. Hence, it will be evident that in the event of a puncture the air will escape from the punctured compartment only, leaving the other compartments intact and inflated. The tire therefore remains sufficiently inflated for further use, and removal of the tire for repairs may be postponed without danger of injury to the inner tube or the outer casing of the tire, until a place where repairs may be conveniently made is reached.

The auxiliary tube 10 is provided with an ordinary inflating valve 11.

The apertures 8 are adjacent to the base of the partitions 7 or that portion nearest the wheel rim. The partitions are here increased in thickness so that an aperture of substantial length may be produced, and the walls of the apertures at the ends thereof are rounded off to prevent chafing and cutting of the auxiliary tube. The main inner tube 6 and the auxiliary tube 10 are cemented together where the inflating valve 11 is applied to the latter, but otherwise the two tubes are entirely free from each other.

It will be noted that the auxiliary tube 10 bulges out midway between the partitions 7 when it is inflated, and that it tapers in the direction of the partitions. When one of the compartments of the inner tube 6 is punctured, the partitions 7 defining that compartment will be pressed toward each other somewhat, and by this action the apertures 8, owing to the shape of the auxiliary tube, will be sealed more effectively, if possible, than before. As the auxiliary tube is continuous it is devoid of weak parts and all parts are equally durable, and it is preferably made of pure rubber without canvas or other textile insertions, so that it may freely expand and stop up the apertures 8 when it is inflated.

I claim:

An inner tube for pneumatic tires having a series of transverse partitions dividing the interior of said tube into separate compartments, with apertures in said partitions for establishing communication between the compartments, a continuous expansible auxiliary tube inclosed in the aforesaid tube and passing through the compartments thereof and through the apertures in the partitions, said auxiliary tube being inflatable to close the apertures, and having a taper in the direction of the apertures, and inflating valves connected to both tubes.

EFFIE MAY PEARSON.